United States Patent
Pialot et al.

(10) Patent No.: US 11,691,368 B2
(45) Date of Patent: Jul. 4, 2023

(54) METHOD FOR MANUFACTURING A PNEUMATIC TIRE WITH AN IMPROVED TREAD

(71) Applicant: Compagnie Generale Des Etablissements Michelin, Clermont-Ferrand (FR)

(72) Inventors: Frederic Pialot, Clermont-Ferrand (FR); Thomas Fabre, Clermont-Ferrand (FR); Pierre Wiel, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 278 days.

(21) Appl. No.: 16/629,874

(22) PCT Filed: Jul. 2, 2018

(86) PCT No.: PCT/FR2018/051635
§ 371 (c)(1),
(2) Date: Jan. 9, 2020

(87) PCT Pub. No.: WO2019/012202
PCT Pub. Date: Jan. 17, 2019

(65) Prior Publication Data
US 2020/0230904 A1 Jul. 23, 2020

(30) Foreign Application Priority Data
Jul. 11, 2017 (FR) .................................... 1756542

(51) Int. Cl.
*B29D 30/06* (2006.01)
*B29D 30/58* (2006.01)
(Continued)

(52) U.S. Cl.
CPC ......... *B29D 30/0678* (2013.01); *B29D 30/58* (2013.01); *B29D 2030/0011* (2013.01); *B29K 2021/003* (2013.01); *B60C 5/007* (2013.01)

(58) Field of Classification Search
CPC ...................................................... B29D 30/62
(Continued)

(56) References Cited

U.S. PATENT DOCUMENTS 2,569,935 A    10/1951  Leguillon et al.
2,724,425 A *  11/1955  Ostling ............... B29C 45/1459
                                                      425/582
(Continued)

FOREIGN PATENT DOCUMENTS

CN    103201121 A    7/2013
CN    106536222 A    3/2017
(Continued)

OTHER PUBLICATIONS

ESpaceNet Translation of FR2005116 (Year: 2021).*
(Continued)

*Primary Examiner* — Katelyn W Smith
*Assistant Examiner* — Alexander D Booth
(74) *Attorney, Agent, or Firm* — Dickinson Wright PLLC; Steven C. Hurles

(57) ABSTRACT

The method comprises the steps of a) forming a carcass composed of a cured rubber material and b) overmolding, on the carcass, at least one thermoplastic elastomer material in order to finish the pneumatic tire.

14 Claims, 2 Drawing Sheets

(51) Int. Cl.
  *B29D 30/00*  (2006.01)
  *B29K 21/00*  (2006.01)
  *B60C 5/00*  (2006.01)
(58) Field of Classification Search
  USPC .............................. 156/125; 264/328.3, 259
  See application file for complete search history.

(56) References Cited

U.S. PATENT DOCUMENTS

| | | | | | |
|---|---|---|---|---|---|
| 2,873,790 | A | * | 2/1959 | Varvaro | B29D 30/06 |
| | | | | | 156/332 |
| 3,769,122 | A | * | 10/1973 | Coddington | B29D 30/0681 |
| | | | | | 252/72 |
| 4,088,523 | A | * | 5/1978 | Gallizia | B29C 45/164 |
| | | | | | 425/130 |
| 4,139,592 | A | * | 2/1979 | Gallizia | B29D 30/52 |
| | | | | | 264/328.8 |
| 4,166,832 | A | | 9/1979 | Gallizia | |
| 4,253,513 | A | * | 3/1981 | Larson | B29D 30/08 |
| | | | | | 264/501 |
| 2007/0044894 | A1 | * | 3/2007 | Majumdar | B29D 30/0005 |
| | | | | | 156/128.6 |
| 2009/0184443 | A1 | * | 7/2009 | Vannan | B29D 30/62 |
| | | | | | 264/328.3 |
| 2017/0157987 | A1 | * | 6/2017 | Huyghe | B60C 11/02 |

FOREIGN PATENT DOCUMENTS

| | | | | |
|---|---|---|---|---|
| DE | 4002610 | A1 | 8/1991 | |
| EP | 729825 | A2 * | 9/1996 | ......... B29D 30/0005 |
| EP | 3385094 | A1 | 10/2018 | |
| FR | 2005116 | A1 | 12/1969 | |
| FR | 2391063 | A1 | 12/1978 | |
| GB | 1542132 | A * | 3/1979 | ......... B29D 30/0005 |
| JP | 2015208880 | A | 11/2015 | |
| SU | 1454726 | A * | 1/1989 | ............ B29D 30/62 |
| WO | 2015193719 | A1 | 12/2015 | |

OTHER PUBLICATIONS

ESpaceNet Translation of JP201508880 (Year: 2021).*
ESpaceNet Translation of EP729825 (Year: 2022).*
SU1454726 Abstract ESpaceNet Translation (Year: 2023).*
AM3400 VI, "Elastomeres thermoplastiques [Thermoplastic elastomers] (TPE)", Michel Biron, Techniques de l'ingenieur, Jul. 10, 2000, www.techniques-ingenieur.fr.

* cited by examiner

METHOD FOR MANUFACTURING A PNEUMATIC TIRE WITH AN IMPROVED TREAD

CROSS-REFERENCE TO RELATED APPLICATIONS

The present application claims priority to PCT International Patent Application No. PCT/FR2018/051635, filed Jul. 2, 2018, which claims priority to FR 1756542, filed Jul. 11, 2017.

TECHNICAL FIELD

The present disclosure relates to a process for manufacturing a pneumatic tire.

BACKGROUND

Pneumatic tires are usually formed from parts made of rubber materials such as diene elastomers which are assembled. Uncured pneumatic tires are generally manufactured from drums by following known steps of flat manufacturing on a first drum, of building on a second drum and then of finishing. A final curing step allows the uncured plastic material to become elastic notably by vulcanization. Such a manufacturing process conventionally lasts about twenty minutes for a passenger vehicle pneumatic tire.

The reason for this is that the curing time is directly influenced by the mass of the pneumatic tire and thus the type of pneumatic tire. Thus, for a passenger vehicle pneumatic tire weighing about 10 kg, the curing time is of the order of 10 minutes, whereas for heavy-duty vehicle pneumatic tires or construction vehicle pneumatic tires weighing from several tens of kilograms to several tons, the curing time ranges from 40 minutes to several days.

For ecological and qualitative reasons, these rubber materials still need to be optimized in order to reduce their rolling resistance and to improve their performance qualities (chemical resistance, mechanical strength, etc.) while at the same time improving their recyclability.

SUMMARY

The aim of the disclosure is to provide a novel process for manufacturing a novel type of pneumatic tire which makes it possible to significantly modify the cost of implementation of the process, the performance qualities of the pneumatic tire and also its recyclability.

To this end, the disclosure relates to a process for manufacturing a pneumatic tire, characterized in that it includes the following steps:
a) forming a carcass based on uncured rubber material and then curing the carcass (3) so as to make it elastic;
b) overmolding on the carcass at least one material based on thermoplastic elastomer.

Advantageously according to the disclosure, the process involves novel types of materials based on one (or more) thermoplastic elastomer(s) (occasionally referred to as TPE). It is thus understood that these materials used in the manufacture of the pneumatic tire partly replace conventional rubber materials.

According to the disclosure, the replacement advantageously concerns, preferentially, the materials to the exterior of the pneumatic tire, i.e. the tread and the exterior sidewalls.

The use of these materials based on thermoplastic elastomer makes it possible, in point of fact, to significantly modify the production costs of the pneumatic tire and also the final performance qualities. By way of example, the rolling resistance, the resistance to external attack (scratching, ozone, oxidation, etc.) may be notably improved when compared with rubber materials. Finally, they are recyclable.

In step a), a conventional carcass is thus manufactured, but, according to the disclosure, it is cured, i.e. notably vulcanized, before being partially overmolded with at least one material based on thermoplastic elastomer. In contrast with the conventional process, this process thus uses a hot material on a cold substrate (cured carcass).

According to other optional implementation characteristics of the disclosure:
step a) includes the phases a1): manufacturing uncured rubber materials, a carcass ply, two bead wires, an air-impermeable inner rubber and crown plies, a2): flat-manufacturing the carcass from the uncured rubber materials, the carcass ply, the two bead wires, the air-impermeable inner rubber and the crown plies, a3): shaping the carcass so that the bead wires are facing each other, and a4): curing the carcass so as to make it elastic;
step b) includes the phases b1): fitting the carcass into a mold, b2): injecting the material based on thermoplastic elastomer to the carcass so as to form exterior side walls and a tread, b3): cooling, in the mold, the assembly obtained during step b2), and b4): releasing the pneumatic tire thus formed from the mold;
during phase b2), a first material based on thermoplastic elastomer is injected to form the exterior sidewalls and a second material based on thermoplastic elastomer is injected to form the tread, the first and second materials based on thermoplastic elastomer being different;
during step b), the mold is maintained at a temperature below 35° C.;
phase b3) allows rigidifying at least the outer surface of the material used based on thermoplastic elastomer by cooling it below a given temperature as a function of the material used based on thermoplastic elastomer;
the given temperature is the glass transition temperature or the melting point of the material used based on thermoplastic elastomer;
the process includes, between step a) and step b), a step c) for modifying the surface of the carcass so as to improve the adhesion of the material of the carcass to the overmolding material of step b);
step c) includes a phase c1) for increasing the area of contact on the parts of the carcass which will receive the overmolding during step b);
phase c1) includes molding for forming relief structures on the parts of the carcass which will receive the overmolding during step b) or a mechanical or chemical treatment for increasing the roughness of the parts of the carcass which will receive the overmolding during step b);
step c) includes a phase c2) for forming a bonding layer on parts of the carcass which will receive the overmolding during step b);
phase c2) includes deposition of a bonding layer on the parts of the carcass which will receive the overmolding during step b) or the formation of chemical bonds on the parts of the carcass which will receive the overmolding during step b).

BRIEF DESCRIPTION OF THE DRAWINGS

Further particular features and advantages will become clearly apparent from the following description, which is given by way of non-limiting example, with reference to the appended drawings, in which.

DETAILED DESCRIPTION OF THE ENABLING EMBODIMENTS

Figure 1:
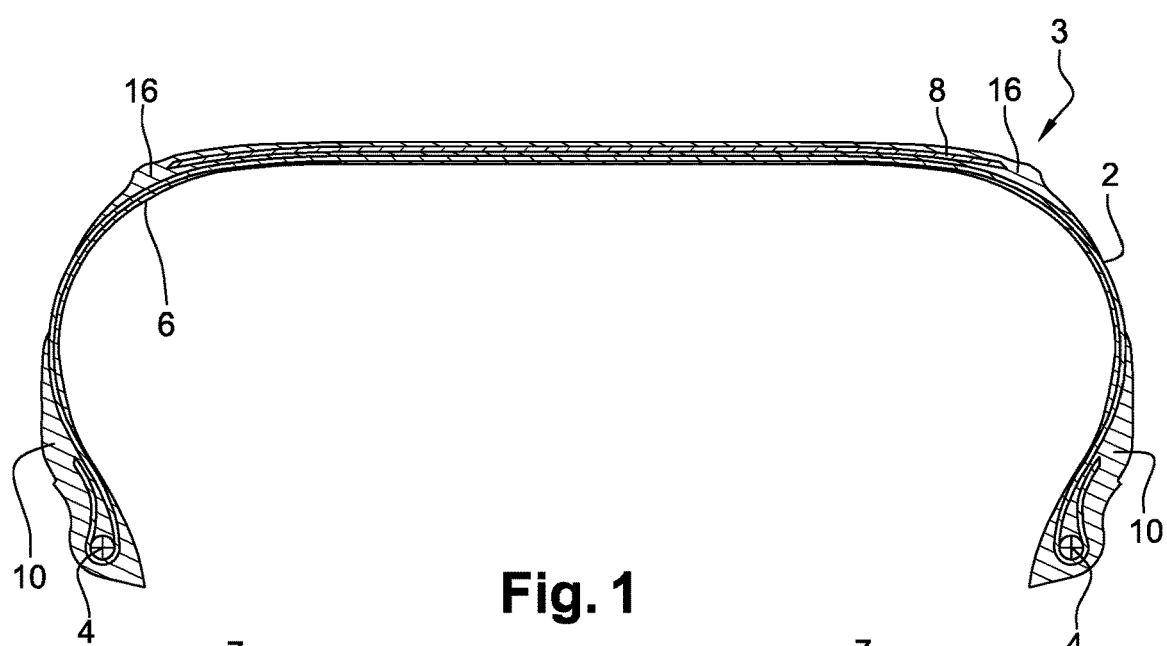
FIG. 1 is a view in partial cross section of a pneumatic tire carcass obtained according to a first step of a process according to the disclosure.

In the various figures, identical or similar elements bear the same references, optionally with an added index. The description of their structure and their function is therefore not systematically repeated.

The term "rubber material" means a thermosetting material such as a diene elastomer, that is to say, in a known manner, an elastomer which is derived, at least partly from (i.e. is a homopolymer or a copolymer of) diene monomers (monomers bearing two conjugated or non-conjugated carbon-carbon double bonds).

The term "tread" means an amount of material delimited by lateral surfaces and by two main surfaces, one of which, referred to as the tread surface, is intended to come into contact with a road surface when the pneumatic tire is rolling.

The term "carcass" means any part not belonging to the exterior sidewalls or to the tread.

The term "material based on thermoplastic elastomer" means a material including all or a portion of block copolymers, constituted of rigid thermoplastic blocks, connected via supple elastomeric blocks. Such materials have mechanical behavior that is both that of an elastomer and of a thermoplastic polymer.

Use will be made, for the definition of the thermoplastic blocks, of the characteristic of glass transition temperature (Tg) of the rigid thermoplastic block. This characteristic is well known to those skilled in the art. It makes it possible notably to choose the industrial processing (transformation) temperature. In the case of an amorphous polymer (or polymer block), the processing temperature is chosen to be substantially greater than the Tg. In the specific case of a semicrystalline polymer (or polymer block), a melting point may be observed which is then greater than the glass transition temperature. In this case, it is instead the melting temperature (TO which makes it possible to choose the processing temperature for the polymer (or polymer block) under consideration. Thus, hereinbelow, when reference is made to "Tg (or Tf, where appropriate)", it will be necessary to consider that it is the given temperature for the processing.

The elastomer blocks may be any elastomer known to a person skilled in the art.

As examples, which are in no way limiting, of materials based on thermoplastic elastomer, mention may be made, for example, of materials at least partly including blocks of the SIS, SBS, SEBS or SIBS type (cf. reference AM3400 V1, "Élastomères thermoplastiques [Thermoplastic elastomers] (TPE)", Michel Biron, Techniques de l'ingénieur, 10 Jul. 2000).

The disclosure applies to any type of pneumatic tire, notably pneumatic tyres intended to equip motor vehicles of the passenger vehicle, SUV ("Sports Utility Vehicles"), two-wheel vehicle (notably motorcycle) or aircraft type, industrial vehicles chosen from vans, heavy-duty vehicles, that is to say underground trains, buses, heavy road transport vehicles (lorries, tractors, trailers), off-road vehicles, such as heavy agricultural or construction vehicles, or other transportation or handling vehicles.

The disclosure relates to a process for manufacturing a pneumatic tire 1 including a carcass 3 based on rubber material and exterior sidewalls 5 and a tread 7 made of at least one material based on thermoplastic elastomer.

According to a first embodiment, the process includes a first step a) for forming a carcass 3 based on cured rubber material, i.e. based on uncured rubber material which is then cured so as to make the carcass elastic. Specifically, in contrast with the usual process in which a final curing step enables all of the uncured plastic material to become elastic, in the process according to the disclosure, only the carcass 3 is cured so as to become elastic. However, the carcass 3 may be obtained according to the usual manufacturing steps before curing.

In an entirely non-limiting manner, step a) may thus include a first phase a1) for manufacturing uncured rubber materials, a carcass ply 2, two bead wires 4, an air-impermeable inner rubber 6 and crown plies 8. The bead wires 4 preferentially metallic and the crown plies 8 may be formed from a composite based on glass and/or a composite based on carbon fibers and/or a woven fabric and/or a metal depending on the type of pneumatic tire.

Step a) may then include a second phase a2) for flat-manufacturing the carcass 3 on a first drum (not shown) starting with the uncured rubber materials, the carcass ply 2, the two bead wires 4, the air-impermeable inner rubber 6 and the crown plies 8 produced during phase a1). The process may then continue with a third phase a3) for shaping the carcass 3 on a second drum so that the bead wires 4 are facing each other in order, for example, to finish with a phase a4) for curing the carcass so as to make it elastic, for example by vulcanization.

A circular carcass 3 of U-shaped cross-section (sometimes referred to as an Ω "omega" cross section) is thus obtained, as illustrated in FIG. 1, with, notably, crown butts 16 and bead zones 10 intended to be assembled with a customary mounting wheel, sometimes referred to as a rim (not shown).

Figure 2:
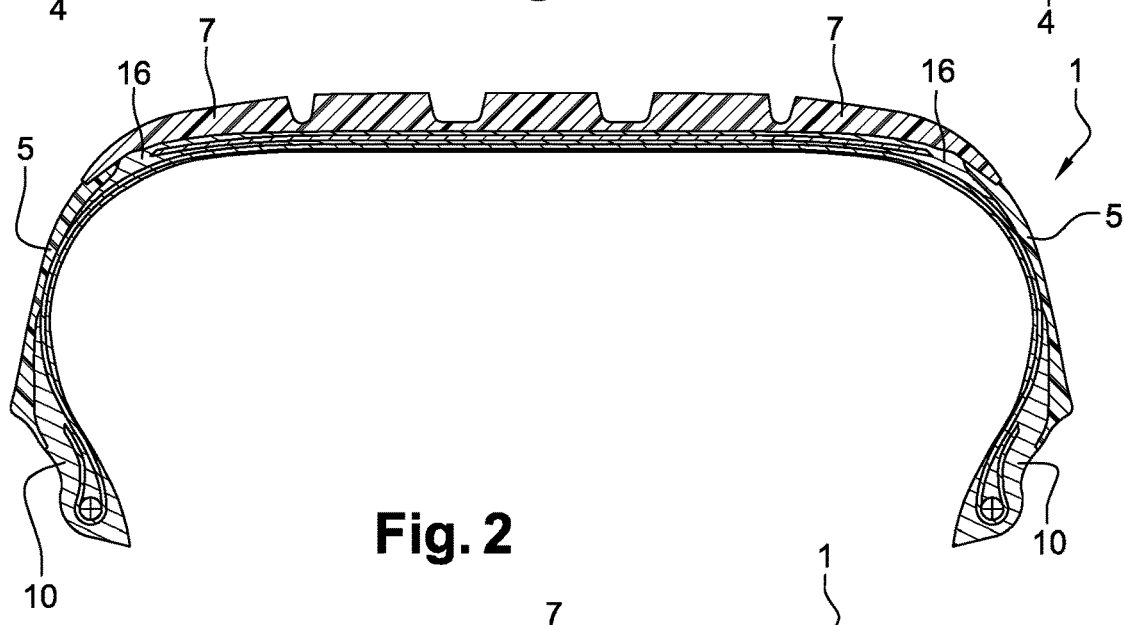
FIG. 2 is a view in partial cross section of a pneumatic tire obtained according to a first embodiment of the process according to the disclosure.

Advantageously according to the disclosure, the process continues with the second step b) for overmolding, on the carcass 3 obtained during step a), at least one material based on thermoplastic elastomer so as to finish the pneumatic tire 1 as illustrated in FIG. 2. Preferentially, step b) may be obtained by casting or by injection into a mold 9.

Figure 4:
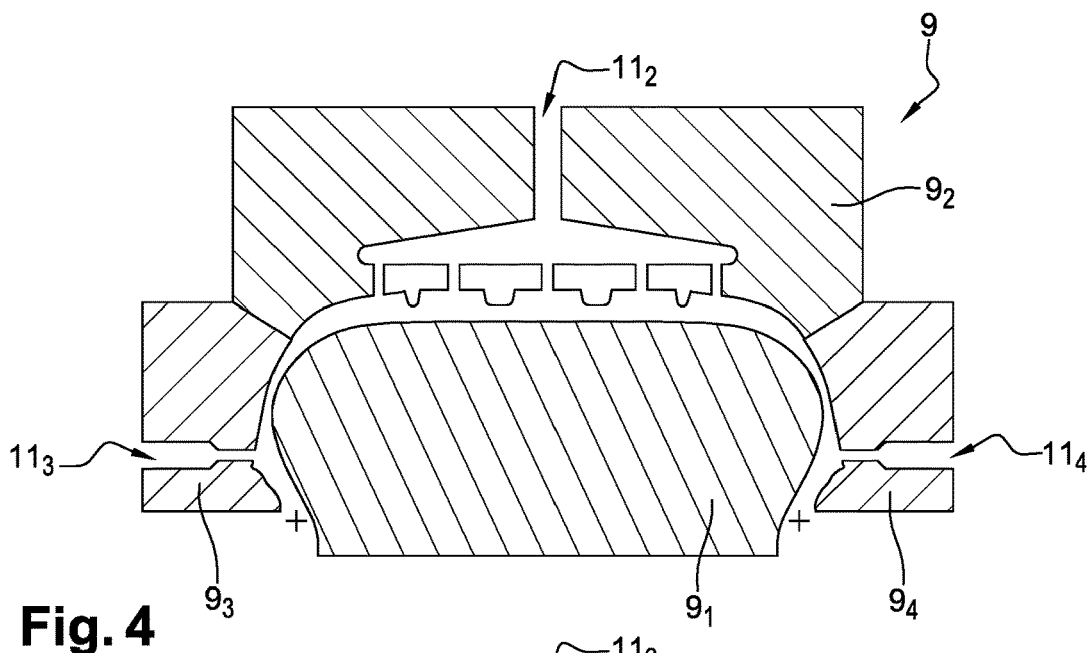
FIG. 4 is a view in partial cross section of a mold for performing the first and second embodiments of the process according to the disclosure.

In an entirely non-limiting manner, an example of a mold 9 according to the disclosure is shown in FIG. 4. It includes a core 9i for maintaining the inner shape of the future pneumatic tire 1, a crown $9_2$ and two sidewalls $9_3$, $9_4$. As is seen in FIG. 4, the crown $9_2$ and the two sidewalls $9_3$, $9_4$ of the mold 9 each include a pipe $11_2$, $11_3$, $11_4$ to feed the mold 9 with material based on thermoplastic elastomer. Preferentially, during step b), the mold 9 is maintained at a temperature below 35° C. and even more preferably at about 20° C.

Figure 5:
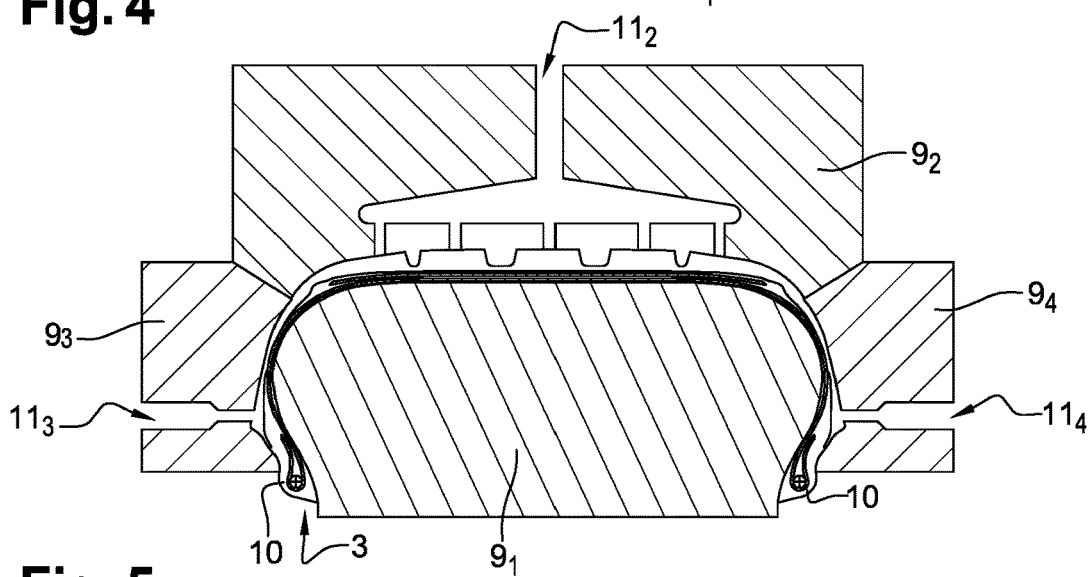
FIG. 5 is a view in partial cross section of a mold for performing the first and second embodiments of the process according to the disclosure after installing the carcass.
Figure 6:
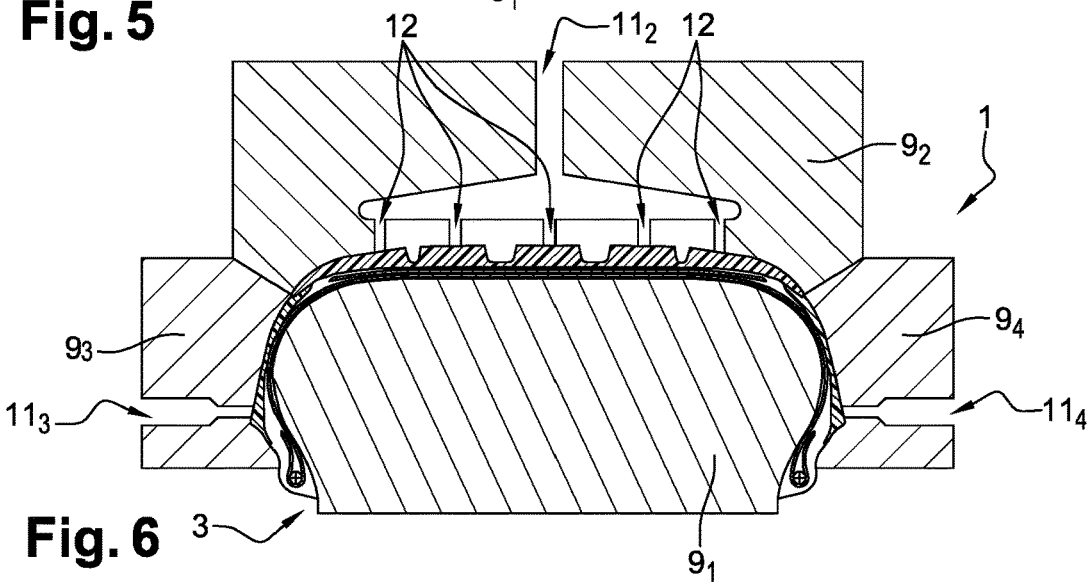
FIG. 6 is a view in partial cross section of a mold for performing the first and second embodiments of the process according to the disclosure after injecting exterior sidewalls and a tread.

As illustrated in an example of the disclosure in FIGS. 5 and 6, the second step b) may thus include a first phase b1) for fitting the carcass 3 into the mold 9. More precisely, the inner surface of the carcass 3 is fitted onto the outer surface of the core 9i and lined on its bead zones 10 with the sidewalls 9₃, 9₄ of the mold 9 as illustrated in FIG. 5. It is noted that the interstice, left between the carcass 3 and the crown 9₂ and two sidewalls 9₃, 9₄, then forms the desired overmolding space.

In an entirely non-limiting manner, the second step b) may then include a second phase b2) for injecting the material based on thermoplastic elastomer onto the carcass 3 so as to form the exterior sidewalls 5 and the tread 7 of the pneumatic tire 1.

The material may thus be injected into one or more pipes 11₂, 11₃, 11₄ of the mold 9 to fill the interstice formed between the carcass 3 and, respectively, the crown 9₂ and the two sidewalls 9₃, 9₄. The injection (or the injections) is preferentially performed at a processing temperature that is substantially higher than the glass transition temperature (or the melting point, where appropriate) of the thermoplastic block of the injected material, for instance above 200° C., and is very rapid, for instance a time of less than 10 seconds.

Preferentially, the material(s) injected and more generally the pneumatic tire obtained is maintained in the mold 9 in a phase b3) so as to cool it below the glass transition temperature (or the melting temperature, where appropriate) of the thermoplastic block of the material based on thermoplastic elastomer for a time of less than 60 seconds by means of the heat exchange with the mold 9 maintained at a temperature below 35° C. as explained above.

Thus, it is desired to ensure the cooling of at least the outer surface of the injected material(s), i.e. the surface in contact with the mold 9, so as to be sufficiently rigid so as not to adhere to the mold 9 and, consequently, to facilitate its release. Needless to say, depending on the type of pneumatic tire (notably its thickness) and the geometry of the mold 9, it may also be desired for the cooling to take place to a greater or lesser depth so that the material at the center of the exterior sidewalls 5 and of the tread 7 is not deformed during the future release from the mold 9.

By way of example, the injection step may thus last for about two seconds and the cooling step between 10 and 20 seconds for the formation of the exterior sidewalls 5 and of the tread 7 of a passenger vehicle pneumatic tire.

The bonding between the material based on thermoplastic elastomer and the carcass 3 based on cured rubber material is promoted by the pressures reached during the injection, preferentially greater than 1000 bar, and the good wettability of the material based on thermoplastic elastomer, which, by virtue of the injection temperature, is in its liquid phase. Finally, step b) ends with phase b4) for releasing the pneumatic tire 1 thus formed from the mold 9.

In a preferred variant illustrated in FIGS. 2 and 6, during phase b2), a first material based on thermoplastic elastomer is injected to form the exterior sidewalls 5 and a second material based on thermoplastic elastomer is injected to form the tread 7 so as to optimize their respective functions, i.e. the first and second materials based on thermoplastic elastomer are different and dedicated to their functions. More precisely, the first material must display an advantageous aesthetic appearance to receive the regulatory markings and must be very resistant to mechanical and chemical attack (scratching, ozone, oxidation, etc.), whereas the second material must be optimized in terms of its contact with the ground, notably as regards its dry and wet grip, its wear and its energy (noise and consumption).

Preferentially, the first and second materials are injected so that the material fronts join between the bead zones 10 and the crown butts 16 of the carcass 3 as better illustrated in FIG. 2. In FIG. 6, it may be seen that the first material is thus injected via the pipes 11₃, 11₄ of the mold 9, whereas the second material is injected via the pipe 11₂ of the mold 9 which is branched to fill the interstice formed between the carcass 3 and the crown 9₂ of the mold 9 at several apertures 12 emerging facing the carcass 3.

Advantageously according to the disclosure, the process makes it possible to obtain novel types of pneumatic tire 1 including at least one material based on one (or more) thermoplastic elastomer(s). It is thus understood that the material(s) used in the manufacture of the tread 1 partly replace(s) conventional rubber materials, affording novel advantages for the tread 7 and the external sidewalls 5.

The use of this (these) material(s) based on thermoplastic elastomer makes it possible, in point of fact, to significantly modify the production costs of the pneumatic tire and also the final performance qualities. By way of example, the time for manufacturing the tread 7 is drastically reduced and the manufacture can be performed automatically. Furthermore, the rolling resistance, the resistance to external attack (scratching, ozone, oxidation, etc.) may be notably improved when compared with rubber materials. Finally, it is (they are) recyclable.

According to a second embodiment, the process includes the same first step a) for forming a carcass 3 based on cured rubber material as in the first embodiment with the same technical effects and advantages. A circular carcass 3 of U-shaped cross-section (sometimes referred to as an Ω "omega" cross section) is thus obtained, as illustrated in FIG. 1, with, notably, crown butts 16 and a bead zone 10 intended to be assembled with a customary mounting wheel (not shown).

However, before performing step b), the process in the second embodiment includes a second step c) for modifying the surface of the carcass 3 so as to improve the adhesion of the material of the carcass 3 to the overmolding material of the third step b);

According to a first variant, step c) may thus include a phase c1) for increasing the area of contact on the parts of the carcass 3 which will receive the overmolding during step b). Such a phase c1) may comprise molding for forming structures in relief on the parts of the carcass 3 which will receive the overmolding during step b). It is thus understood that this molding might notably be performed at the same time as phase a4) of curing the carcass 3.

According to another possibility, phase c1) may comprise a mechanical and/or chemical treatment for increasing the roughness of the parts of the carcass 3 which will receive the overmolding during step b).

According to a second variant, step c) may include a phase c2) for forming a bonding layer on parts of the carcass 3 which will receive the overmolding during step b). Phase c2) could thus include the deposition of a bonding layer 13 that is particularly favorable towards adhering to the carcass 3 and the material that will be overmolded during the third step b). It is understood that one (or more) bonding layer(s) 13 may be deposited on all or a part of the carcass parts 3 which will receive the overmolding during step b). By way of example, the bonding layer(s) may be a material based on thermoplastic elastomer or a hybrid diene material comprising one (or more) material(s) based on thermoplastic elastomer.

According to another possibility, phase c2) may comprise the implementation of a chemical reaction for creating chemical bonds between the carcass 3 and the material overmolded during step b). It is thus understood that this chemical reaction could notably be performed at the same time as the injection phase b2) allowing activation by heat, pressure or by an external activator.

Figure 3:
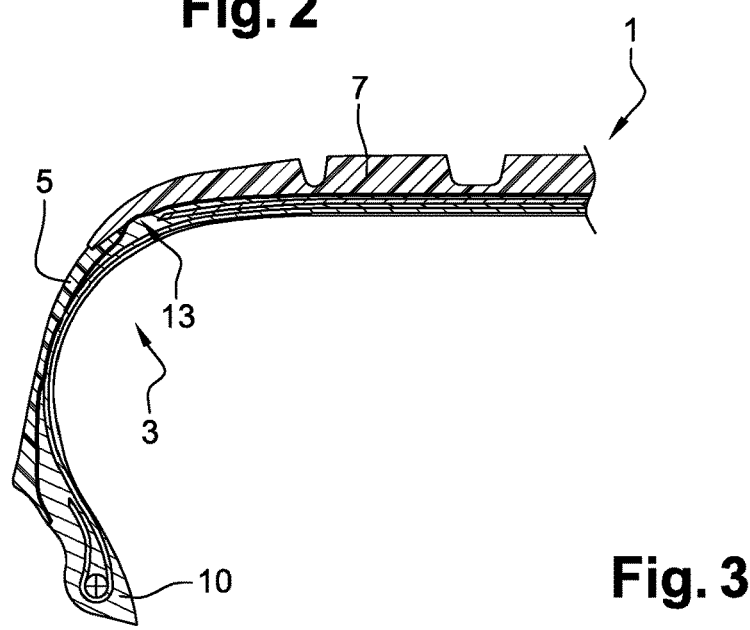
FIG. 3 is a view in partial cross section of a pneumatic tire obtained according to a second embodiment of the process according to the disclosure.

Advantageously according to the second embodiment of the disclosure, the process continues with the third step b) for overmolding, on the carcass 3 obtained during step a) and modified during step c), at least one material based on thermoplastic elastomer so as to finish the pneumatic tire 1 as illustrated in FIG. 3. As for the first embodiment, the third step b) may be obtained by casting or by injection in a mold 9 with the same technical effects and advantages as the first embodiment.

Advantageously according to the second embodiment of the disclosure, the process makes it possible to obtain novel ranges of pneumatic tire 1 including at least one material based on one (or more) thermoplastic elastomer(s). It is thus understood that the material(s) used in the manufacture of the tread 1 partly replace(s) conventional rubber materials, affording novel advantages for the tread 7 and the external sidewalls 5.

The use of this (these) material(s) based on thermoplastic elastomer makes it possible, in point of fact, to significantly modify the production costs of the pneumatic tire and also the final performance qualities. By way of example, the time for manufacturing the tread 7 is drastically reduced and the manufacture is performed automatically. Furthermore, the rolling resistance, the resistance to external attack (scratching, ozone, oxidation, etc.) may be notably improved when compared with rubber materials. Finally, it is (they are) recyclable and may be manufactured from green sources.

The disclosure is not limited to the embodiments and alternative forms thereof presented and other embodiments and alternative forms will be clearly apparent to a person skilled in the art.

What is claimed is:

1. A process for manufacturing a pneumatic tire, characterized in that it comprises the following steps:
    a) forming a carcass comprising uncured rubber materials, a carcass ply, two bead wires (4), an air-impermeable inner rubber and crown plies and then totally curing only the carcass so as to make it elastic;
    b) overmolding on the carcass obtained in step a) at least one material based on a thermoplastic elastomer by injecting a material based on the thermoplastic elastomer into a mold so as to form, onto the carcass, exterior sidewalls and a tread.

2. The process according to claim 1, in which step a) includes the following phases:
    a1) flat-manufacturing the carcass from uncured rubber materials, the carcass ply, the two bead wires (4), the air-impermeable inner rubber and the crown plies; and
    a2) shaping the carcass so that the bead wires (4) are facing each other.

3. The process according to claim 1, in which step b) includes the following phases:
    b1) fitting the carcass into the mold;
    b2) injecting the material based on thermoplastic elastomer onto the carcass so as to form the exterior sidewalls and the tread, thereby forming an assembly;
    b3) cooling, in the mold, the assembly obtained during step b2);
    b4) releasing the pneumatic tire thus formed from the mold.

4. The process according to claim 3, in which, during phase b2), a first material based on thermoplastic elastomer is injected to form the exterior sidewalls and a second material based on thermoplastic elastomer is injected to form the tread, the first and second materials based on thermoplastic elastomer being different, and the first and second materials being injected simultaneously.

5. The process according to claim 3, in which, during step b), the mold is maintained at a temperature below 35° C.

6. The process according to claim 3, in which phase b3) allows rigidifying at least the outer surface of the material used based on thermoplastic elastomer by cooling it below a given temperature as a function of the material used based on thermoplastic elastomer.

7. The process according to claim 6, in which the given temperature is the glass transition temperature or the melting point of the material used based on thermoplastic elastomer.

8. The process according to claim 1, including, between step a) and step b), a step c) for modifying the surface of the carcass so as to improve the adhesion of the material of the carcass to the overmolding material of step b).

9. The process according to claim 8, in which step c) includes a phase c1) for increasing the area of contact on the parts of the carcass which will receive the overmolding during step b).

10. The process according to claim 9, in which phase c1) includes molding for forming structures in relief on the parts of the carcass which will receive the overmolding during step b).

11. The process according to claim 9, in which phase c1) includes a mechanical or chemical treatment for increasing the roughness of the parts of the carcass which will receive the overmolding during step b).

12. The process according to claim 8, in which step c) includes a phase c2) for forming a bonding layer on parts of the carcass which will receive the overmolding during step b).

13. The process according to claim 12, in which phase c2) includes deposition of a bonding layer on the parts of the carcass which will receive the overmolding during step b).

14. The process according to claim 12, in which phase c2) includes the formation of chemical bonds on the parts of the carcass which will receive the overmolding during step b).

* * * * *